No. 628,827. Patented July 11, 1899.
J. F. MATHIAS.
APPARATUS FOR EFFECTING SELECTION OF WHEAT GRAINS FOR SOWING.
(Application filed Apr. 5, 1898.)
(No Model.) 5 Sheets—Sheet 1.
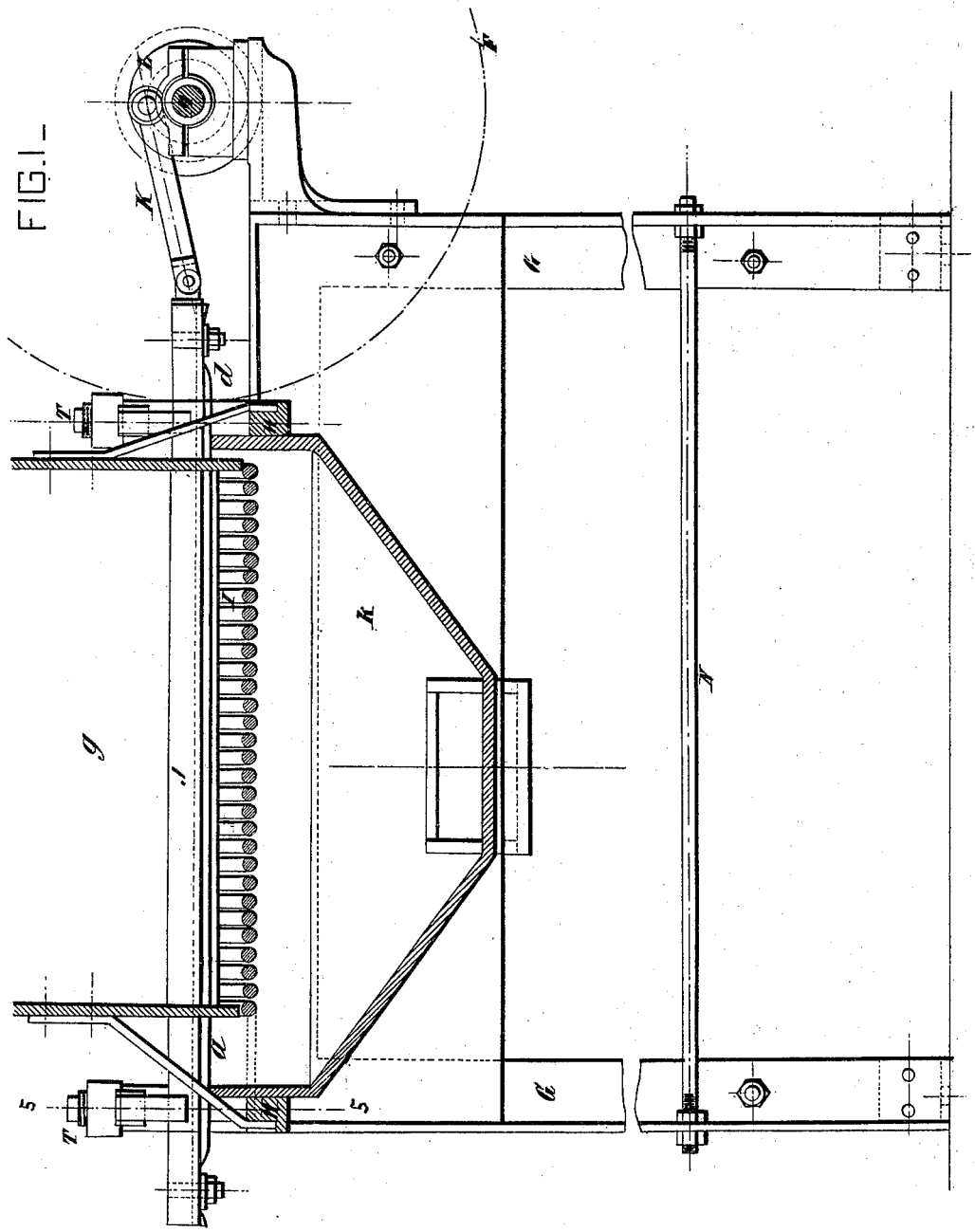

No. 628,827. Patented July 11, 1899.
J. F. MATHIAS.
APPARATUS FOR EFFECTING SELECTION OF WHEAT GRAINS FOR SOWING.
(Application filed Apr. 5, 1898.)
(No Model.) 5 Sheets—Sheet 2.
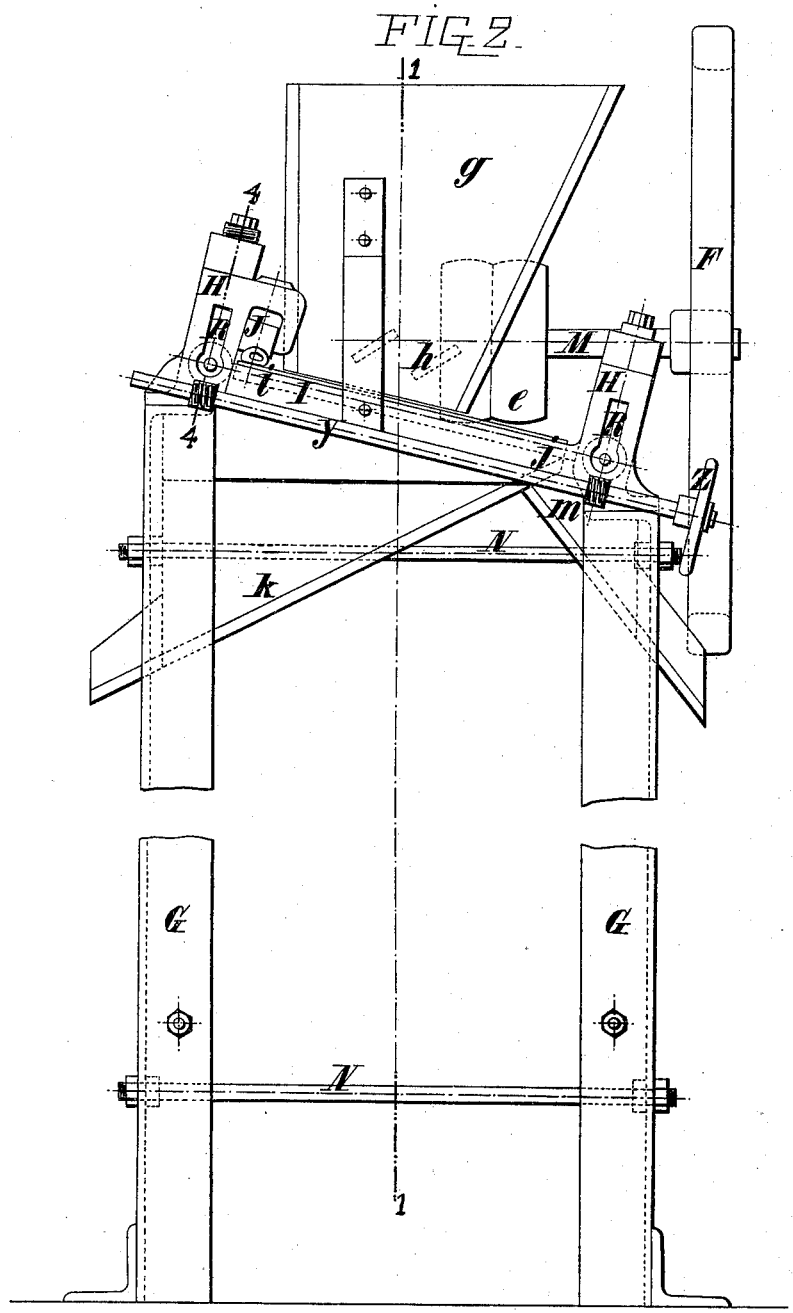

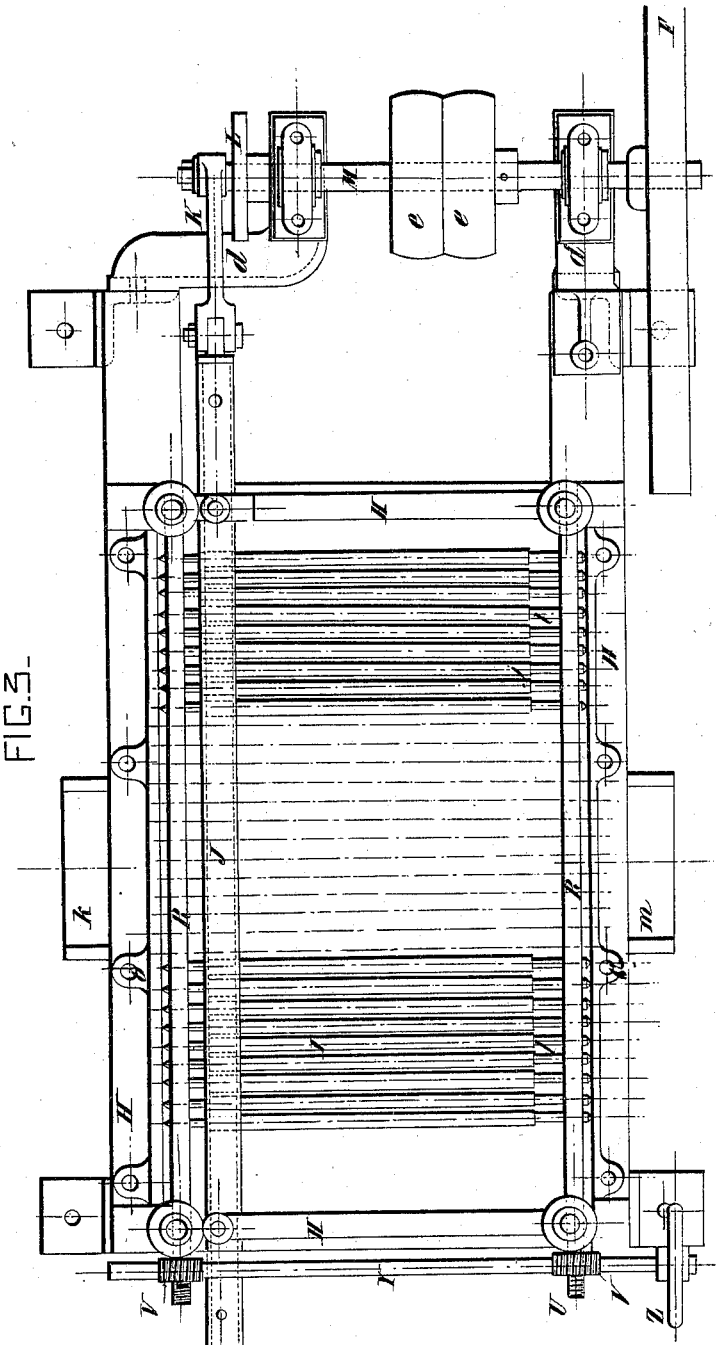

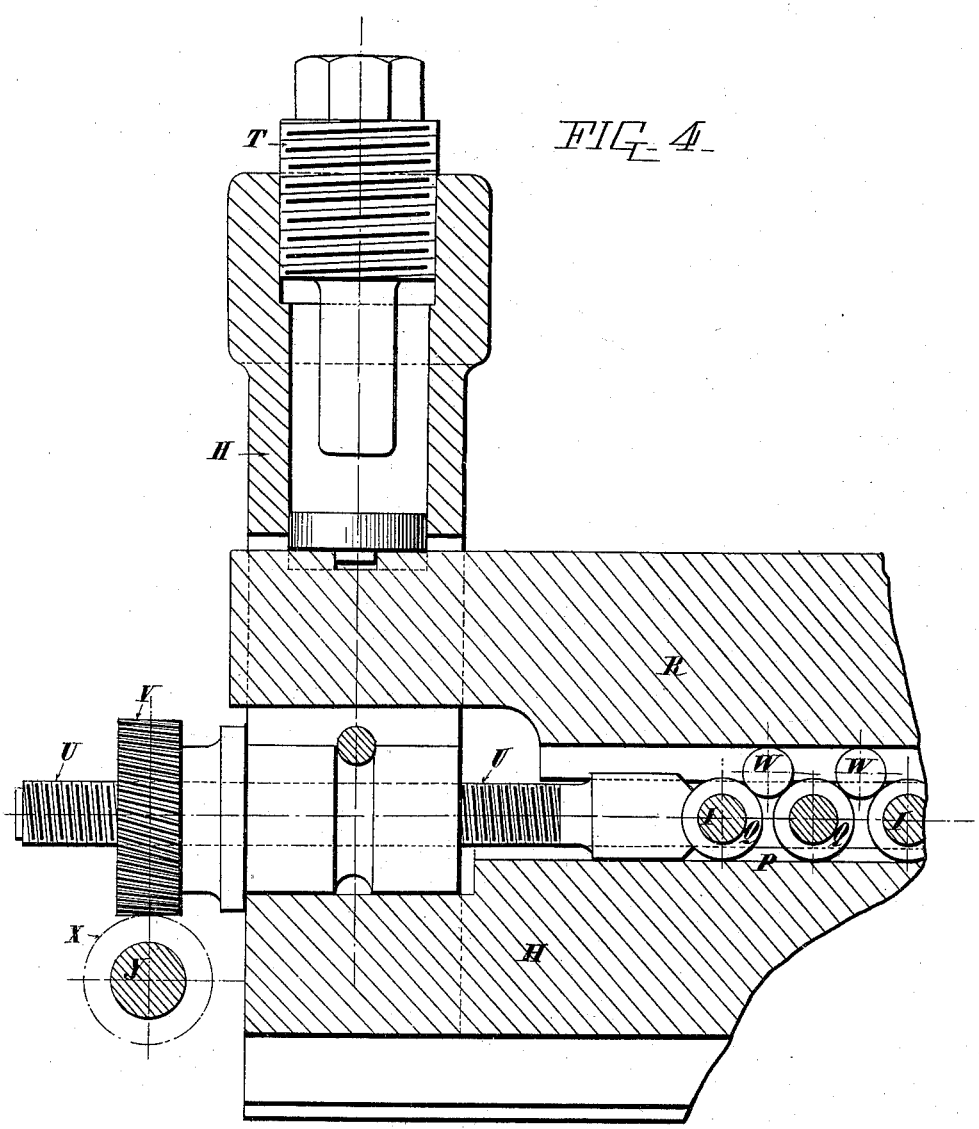

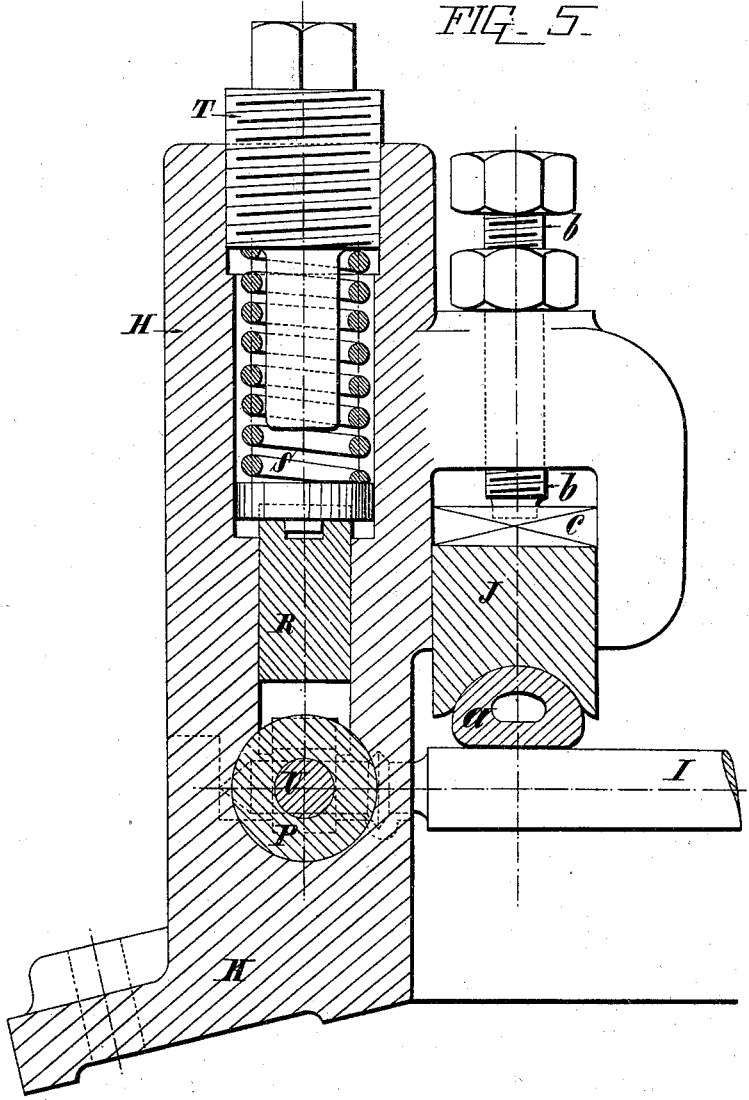

UNITED STATES PATENT OFFICE.

JULES FRANÇOIS MATHIAS, OF GONESSE, FRANCE.

APPARATUS FOR EFFECTING SELECTION OF WHEAT-GRAINS FOR SOWING.

SPECIFICATION forming part of Letters Patent No. 628,827, dated July 11, 1899.

Application filed April 5, 1898. Serial No. 676,514. (No model.)

*To all whom it may concern:*

Be it known that I, JULES FRANÇOIS MATHIAS, a citizen of the Republic of France, residing at Gonesse, (Seine-et-Oise,) France, have invented a new and useful Improvement in Apparatus for Effecting the Selection of Wheat-Grains for the Purpose of Sowing, which is fully set forth in the following specification.

The selection of seed-grain is a necessary operation when it is desired to obtain good harvests and not to see the said harvests diminishing in a few years by reason of a constant degeneration of the grain. For this purpose the growers are obliged every three or four years to renew their seed-grain by procuring supplies from specialists who cultivate high-quality grain and sell them at relatively high prices. This degeneration is easily explained. For example, with reference to the cultivation of wheat, if we consider a field that has been sown for the first time with high-quality grain the average of the grain obtained at the harvest will be appreciably inferior (all things remaining the same) as regards size and quality to that which is first sown as seed. Certainly the harvest will produce a certain quantity of grain of equal quality to that which has been sown, but very much greater quantity of inferior grain as regards size and quality. If the next year another sowing be made with grain taken indifferently from the first harvest, the second harvest will be still inferior to the preceding harvest, and so on from year to year the proportion of fine grain will diminish, and the yield will become less. This degeneration therefore compels the grower to sow his land with a fresh quantity of choice grain under penalty of otherwise having gradually-decreasing harvests. The progressive increase of degeneration is due to three principal causes.

First. Whatever may be the means of sowing ordinarily employed it is impossible to avoid a crowding together and sowing too closely of the scattered seed, which facts are injurious to the normal development of the plant, because the plant has not then a sufficient space for development and nourishment. It grows badly and produces ears which are not so fine, and consequently yield grain of lower quality than the original seed.

Second. On the other hand, the sown grain does not all grow up nor does it always grow under favorable conditions, and according as the land is manured with more or less regularity or that certain portions thereof are more or less fertile or are situated under different conditions of exposure to the atmospheric influences the plants will form ears of better or worse quality.

Third. The principal cause (which is the one which my machine is designed to obviate) consists in the absence of a perfect and practical selection of the best grain obtained at each harvest and which ought to be kept back for seeding purposes. This last cause aggravates and multiplies the chances of degeneration referred to in the two preceding paragraphs in the sense that in the following years the grain will be employed as seed, of which the greater part will be of less good quality at starting, and therefore can only produce in their turn grain which is more or less degenerated.

It would not be the same state of affairs if the grower could select the very best grain of his harvest and employ it exclusively for sowing purposes, because in such a case he would do away with the principal cause of evil, he would surely improve his cultivation, and he would obtain greater yield in his harvests; but in order to obtain these results the means of selection are wanting, and although winnowing-machines and sorting-machines of the most improved kind tend toward this object they, however, attain this object only in an imperfect degree. On the other hand, the grower cannot get his grain sorted out which is necessary to him for sowing purposes on account of practical and economical reasons.

Now my invention has for its object to effect after the winnowing operation the selection of the finest and largest grain of each harvest in order to reserve it for seed-grain.

This invention is also applicable to all sorting purposes and to all divisions of grain and the like, such as food-grains.

The various grain-sorting apparatus at present known consist of socket apparatus or recessed apparatus, lattice-work with greater or less size of mesh, and divers sieves. These apparatus produce only very imperfect sorting and do not allow of effecting regular divisions and a good selection. The means which I employ to obtain this result is different. According to my invention the sorting is effected on a grating formed by cylindrical bars, which are suitably inclined and at a suitable distance from one another. This distance varies according to the size of the grain that is sorted. The bars of which this grating is composed have imparted to them an alternating rotary motion and they all turn simultaneously in one and the same direction. On placing grain upon the upper part of the grating all those grains which have a diameter smaller than the distance between the bars drop through the bars and through the grating. Now, on the contrary, those of the larger diameter than the said distance will become engaged between the bars in the vacant spaces formed by the intervals of the bars. These intervals form a sort of channel in which the grains of a sufficient size become engaged; but the rotary motion and the inclination of the bars carry these grains along, which, by gravity, following these channels in the direction of the inclination and turning on their own axis, travel to the lower end of the grating. When they have arrived at this point, they leave the bars and drop by their own weight into a funnel which collects and receives them. That is the principle of my apparatus.

Now in order to render the hereinafter-stated explanations as clear as possible, I have illustrated my new apparatus, by way of example, in the accompanying drawings.

Figure 1 is a vertical section of the apparatus. Fig. 2 is the side elevation thereof. Fig. 3 is the plan view, and Figs. 4 and 5 show the details of the mechanism on a larger scale.

My selecting apparatus consists of an iron frame G, supporting the mechanism, and the distributing-channels $k\,m$. Upon this frame there rests a frame H, of cast-iron, which carries the selecting-bars I. These bars receive an alternating rotary motion in consequence of the friction upon them of the straight bar $j$, which is operated by the connecting-rod K, that is itself driven by the crank-disk L, keyed on the motor-shaft M. The framing G consists of two bent angle-irons of horseshoe shape and of different heights, so as to produce the inclined position of the frame H. They are placed parallel to each other and are connected together by means of ties or stays N, Fig. 2.

The frame H, which is fixed on the framing by means of bolts O, is formed with two longitudinal grooves P, Figs. 4 and 5, which serve as a means for regulating the distance apart of the bars I. The ends of the bars are smaller in diameter than their middle portion, which sorts the grain, and the said ends rest in rings Q, Fig. 4, which serve as bearings for the same. The distance apart of the bars is produced by means of the following arrangement:

In the intervals between the bearing-rings Q, at their upper part, there are arranged small rollers W, Fig. 4, of the same diameter, upon which a certain pressure can be exerted by means of the straight bars R, Figs. 4 and 5. These bars R are acted upon by springs S, whose tension can be increased by means of the screws T. The small rollers W may be replaced by balls maintained in a triangular groove formed in the lower face of the straight bar R or by any suitable means. I also reserve the right of dispensing with the springs S and of acting directly on the bar R by means of the screws T. The last bars on the right hand are arrested by stops, while the left-hand bars are capable of moving to a greater or less extent, according to the position of the rods U. The position of these rods U, it is obvious, can be varied by acting upon the pinion V by means of the endless screw X, mounted on a shaft $y$, which carries the hand operating-wheel Z, Figs. 3 and 4.

Let us suppose, for a moment, that the rods U are pushed in to their fullest extent—that is to say, that there is no longer any space between the rings Q. If it is then desired to increase the distance between the sorting-bars I, it is clearly sufficient to act upon the wheel Z in such a manner as to regulate the rods U. Then at once by the action of the straight bars R, which bear upon the rollers W, the latter will enter more deeply between the rings Q and the sorting-bars I will be moved farther apart from one another, but all to an equal distance.

The straight bar $j$, which imparts an alternating circular motion to the sorting-bars I, is fitted at its lower part with a rubber tube $a$, strongly inflated or expanded, which increases the friction of the said straight bar upon the bars I. The pressure of the straight bar $j$ upon the bars I is effected by means of compression-screws $b$ and the plates $c$, Fig. 5. The motor-shaft M rests upon two blocks or collars $d$, Fig. 3, fixed on the frame G. This shaft carries two pulleys $e$ for driving the apparatus by means of shafting or belting, and it also carries a wheel F, which may be provided with a handle for driving by hand.

The grains to be sorted are charged into a hopper $g$, Figs. 1 and 2, arranged above the bars I. This hopper is provided at its lower part with small inclined shutters or gates $h$, which divide the bottom into several compartments. The grains which have passed in the spaces between the sorting-bars fall into a chute $k$, arranged underneath; but the grains, on the contrary, which have not been able to pass through the spaces between the bars fall through the larger spaces $l$ and drop into a passage $m$, placed underneath. It is to be understood that the straight bars $j$ instead of having an alternate to-and-fro movement, as above described, might be replaced by any suitable part which shall transmit to the bars a continuous rotary motion in the same direction and not an alternate to-and-fro motion. These bars might also, instead of forming an inclined plane, be arranged horizontally. In this case, then, the grain which remained on the bars would be removed by any suitable mechanical means.

The above-described sorting-machine may also, if desired, be combined with a winnowing-machine of any kind.

Having thus described my invention, what I claim is—

1. The combination of a suitably-supported hopper, rotary sorting-bars arranged therein alongside of each other, a friction-bar passing through the hopper, across and in contact with said sorting-bars, and means for reciprocating said friction-bar, substantially as set forth.

2. The combination of a suitably-supported hopper, rotary sorting-bars arranged therein, a friction-bar having a rubber tube on one side, in contact with said sorting-bars, and means for reciprocating said friction-bar, substantially as set forth.

3. The combination of a frame having suitable grooves, rotary sorting-bars, the ends of which extend into said grooves, balls or rollers between the ends of said sorting-bars, means for compressing said bars, in the plane thereof, and pressure-bars arranged in said grooves and resting on said balls or rollers, substantially as set forth.

In testimony whereof I have signed this specification in the presence of two subscribing witnesses.

JULES FRANÇOIS MATHIAS.

Witnesses:
    EDWARD P. MACLEAN,
    ANTOINE ROUSSANNES.